Patented Jan. 9, 1923.

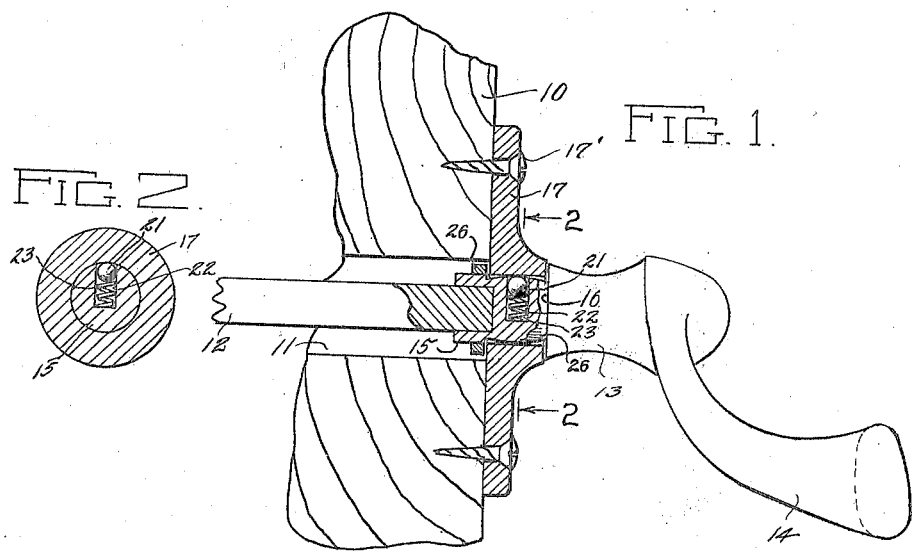
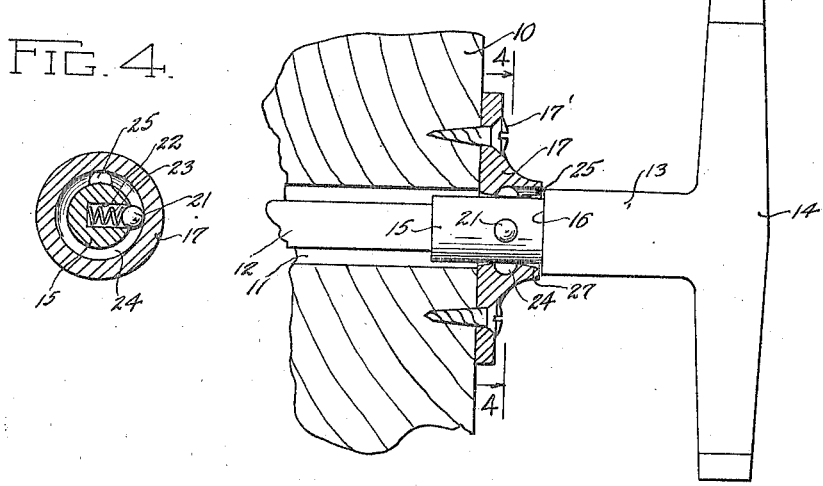

1,441,845

UNITED STATES PATENT OFFICE.

LOUIS W. GATES, OF NEW HAVEN, CONNECTICUT, ASSIGNOR TO C. COWLES AND COMPANY, OF NEW HAVEN, CONNECTICUT, A CORPORATION OF CONNECTICUT.

VEHICLE DOOR HANDLE.

Application filed October 1, 1921. Serial No. 504,759.

*To all whom it may concern:*

Be it known that I, LOUIS W. GATES, a citizen of the United States, residing at New Haven, county of New Haven, State of Connecticut, have invented an Improvement in Vehicle Door Handles, of which the following is a specification.

This invention relates to door handles and especially to handles for vehicle doors, and an object of the invention is to provide simple means for mounting the lock operating spindle that will allow easy manipulation thereof without accurate fitting, but which will at the same time be always tight and not become loose and rattle after continued operation.

Referring to the accompanying drawing, Fig. 1 is a central, vertical sectional elevation of one form of my device applied to a door, Fig. 2 is a transverse section on substantially the line 2—2 of Fig. 1, Fig. 3 is a view similar to Fig. 1 showing a slight modification, and Fig. 4 is a transverse section substantially on line 4—4 of Fig. 3.

In the drawing 10 represents the door provided with opening 11 for the lock operating spindle which comprises the usual square rod 12 connected to the inner end of the stem 13 of the handle 14, the stem being reduced at 15 to provide a bearing, and also a shoulder 16 providing means for limiting the inward movement of the spindle. Secured to the surface of the door by suitable means as screws 17' is an escutcheon 17, provided with a bearing in which the reduced portion 15 of the stem is mounted to turn. In either the spindle or the escutcheon and bearing against the other member I mount a friction element 21. I preferably mount this element in the spindle, as shown. In the preferred form I drill a recess 22 in the spindle transversely from the surface thereof and insert in this recess, to rest against the bottom wall thereof, a resilient member, preferably a coiled spring 23. I then insert, in the recess on the top of this spring, a friction element 21, preferably a ball, which is pressed by the spring against the escutcheon. By this arrangement the reduced portion of the stem or spindle may be formed with a loose fit in the escutcheon, making it much cheaper to manufacture than would an accurate fit which would allow easy turning of the spindle without binding at certain parts of its revolution. The spring and ball reacting against the spindle and escutcheon compensate for any wear between the two elements and prevent rattling after the device has been in use for some time, but, at the same time, allow easy manipulation of the spindle.

In order to make easy installation of the handle to the door and to compensate for any uneven surface of the door which would cause the handle to bind in the bearing if there was no adjustment of the escutcheon, I curve longitudinally either the bearing on the spindle, as shown at 26 in Fig. 1, or the bearing in the escutcheon, as shown at 27 in Fig. 3. This longitudinal curving allows an oscillatory movement of the escutcheon relative to the spindle, as will be obvious.

In the modified construction, shown in Figs. 3 and 4, I have formed an annular, preferably semicircular, groove 24 in the bearing in the escutcheon in which the ball 21 moves as the handle is turned to operate the latch. I also provide at the top of the bearing a short groove 25 leading from the outside of the escutcheon to the groove 24. As the groove 24 is substantially semicircular when in position, the ball 21 is one-half in the escutcheon and one-half in the spindle, as shown in Fig. 4, and securely holds the spindle from withdrawal from the escutcheon, doing away with the stop collar 26 usually employed. The spring 23 is so constructed as to provide a stop, to limit the distance the ball recedes into the spindle. This distance should be about one-half the diameter of the ball, and the spring acts as a stop when it is fully compressed. This stop is necessary in order to keep the handle from pulling out, except when the ball is brought into alignment with groove 25. The ball 21, has, however, the same effect as to preventing rattling, and so forth, as in the form shown in Figs. 1 and 2. By turning the handle a quarter revolution, the ball 21 may be brought to alignment with the groove 25 and the spindle removed, the insertion of the spindle being the reverse of this action. If preferred, the elements may be reversed in this form as well as the form shown in Figs. 1 and 2, that is, the spring and ball may be mounted in the escutcheon and the grooves 24 and 25 formed in the spindle.

It will be apparent the device is very simple in construction, comprising few parts, and will be comparatively cheap to manufacture, as no accurate machining and fitting is required. Also that it is not liable to get out of order.

Having thus set forth the nature of my invention, what I claim is:

1. A device of the class described comprising an escutcheon, a lock operating spindle mounted to turn in said escutcheon, friction means carried by the spindle and contacting with said escutcheon, said means being movable substantially radially of the spindle, and resilient means to hold said means in contact with said escutcheon.

2. A device of the class described comprising an escutcheon, a lock operating spindle mounted to turn in said escutcheon, one of said elements provided with a recess, a movable friction element in said recess and bearing against the other element, and a resilient means in the recess for holding said friction element in contact with the other element.

3. A device of the class described comprising an escutcheon, a lock operating spindle mounted to turn in said escutcheon, one of said elements being provided with a recess, a ball in said recess, and a resilient means in the recess to hold the ball in contact with the other element.

4. A device of the class described comprising an escutcheon, a lock operating spindle mounted to turn in said escutcheon, a recess in said spindle, a ball in said recess adapted to contact with a surface of the escutcheon, and movable substantially radially of the spindle and a spring in said recess to hold the ball against said escutcheon.

5. A device of the character described comprising an escutcheon, a lock operating spindle mounted to turn in said escutcheon, a friction means carried by one of said elements and movable in a direction substantially normal to the axis of rotation of the spindle, and a resilient means to yieldingly hold said friction means against the other element.

6. A device of the character described comprising an escutcheon, a lock operating spindle mounted to turn in the escutcheon, one of said members being provided with an annular groove and the other with a recess, a friction element mounted in the recess and groove, and resilient means tending to press said friction element into said groove.

7. A device of the class described comprising an escutcheon, a lock operating spindle mounted to turn in said escutcheon, a friction element carried by one of said members, and resilient means for pressing said element against the other member, said element being also arranged to prevent removal of the spindle.

8. A device of the class described comprising an escutcheon, a lock operating spindle mounted to turn in said escutcheon, one of said members being provided with a recess and the other with an annular groove, a friction element mounted partly in the recess and partly in the groove, said element being movable in a direction substantially normal to the axis of rotation of the spindle, and a resilient means in the recess to retain said element in said groove.

9. A device of the class described comprising an escutcheon, a lock operating spindle mounted to turn in said escutcheon, said escutcheon being provided with an annular groove and the said spindle with a recess, a ball partly in the recess and partly in the groove, and a spring in the recess to press the ball into the groove.

10. A device of the character described comprising an escutcheon, a lock operating spindle mounted to turn in said escutcheon, the bearing of one of said members being curved longitudinally thereof to allow an oscillatory movement of the escutcheon on the spindle, a movable friction element carried by one of said members, and resilient means for pressing said element against the other member.

In testimony whereof I affix my signature.

LOUIS W. GATES.